Figure 4:
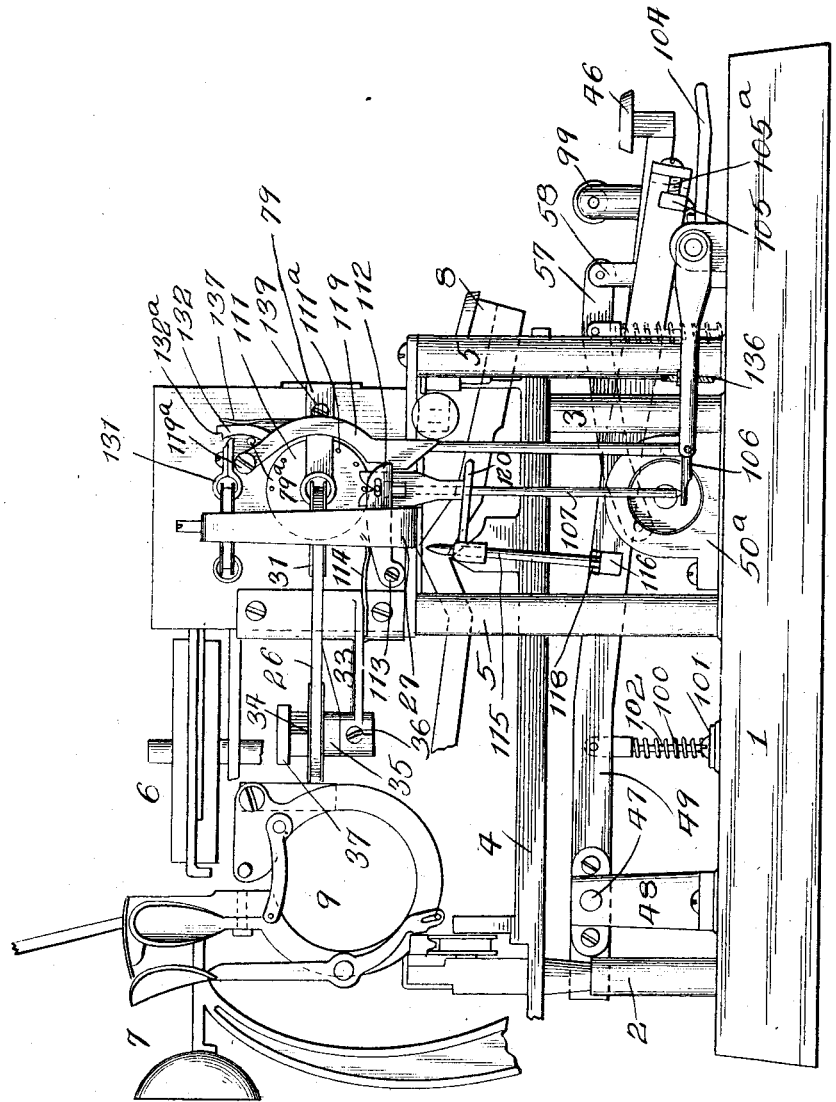

E. H. GUYER.
COMBINED TYPE WRITING AND COMPUTING MACHINE.
APPLICATION FILED JUNE 2, 1908.
1,137,754.
Patented May 4, 1915.
12 SHEETS—SHEET 1.
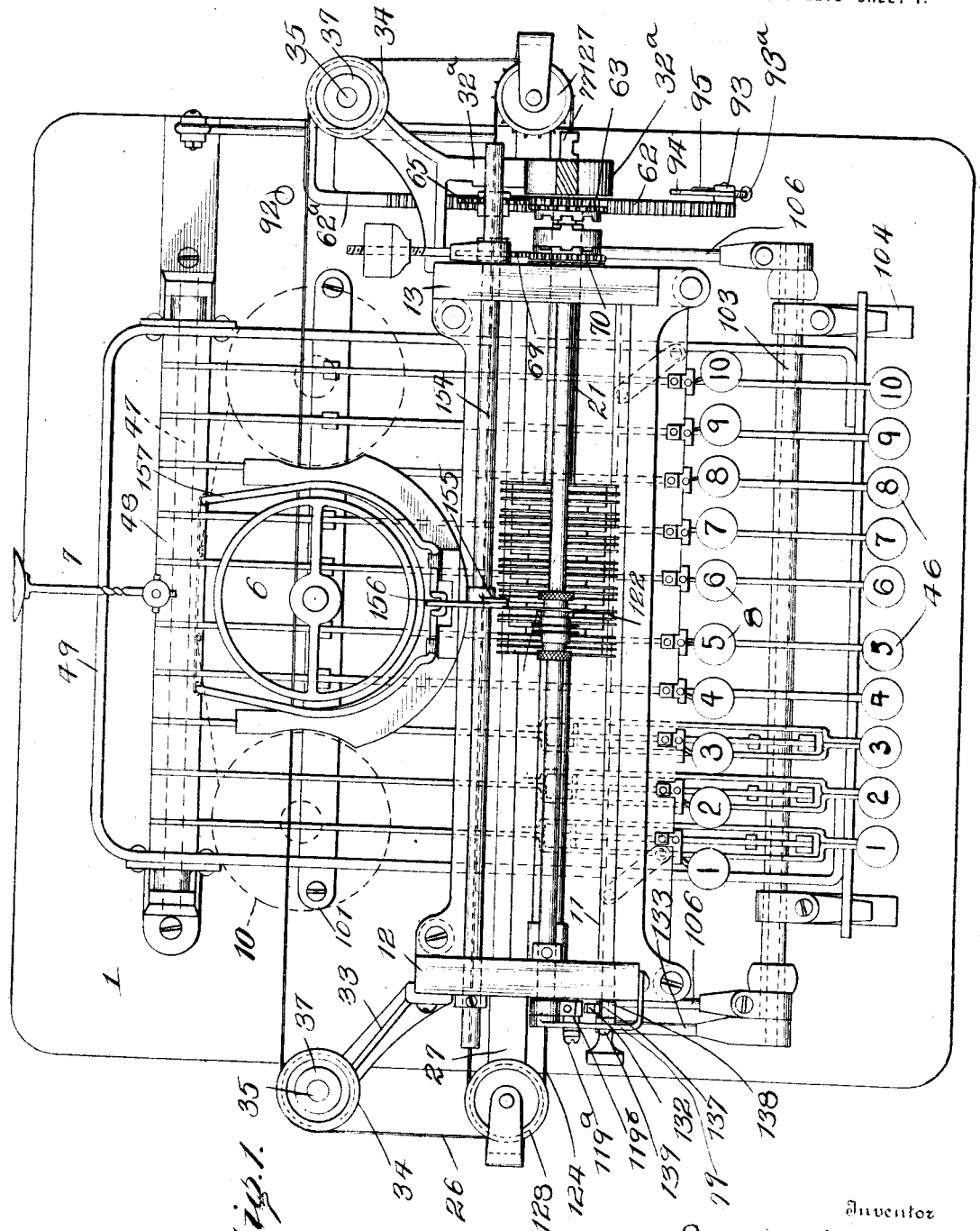

E. H. GUYER.
COMBINED TYPE WRITING AND COMPUTING MACHINE.
APPLICATION FILED JUNE 2, 1908.

1,137,754. Patented May 4, 1915.
12 SHEETS—SHEET 2.

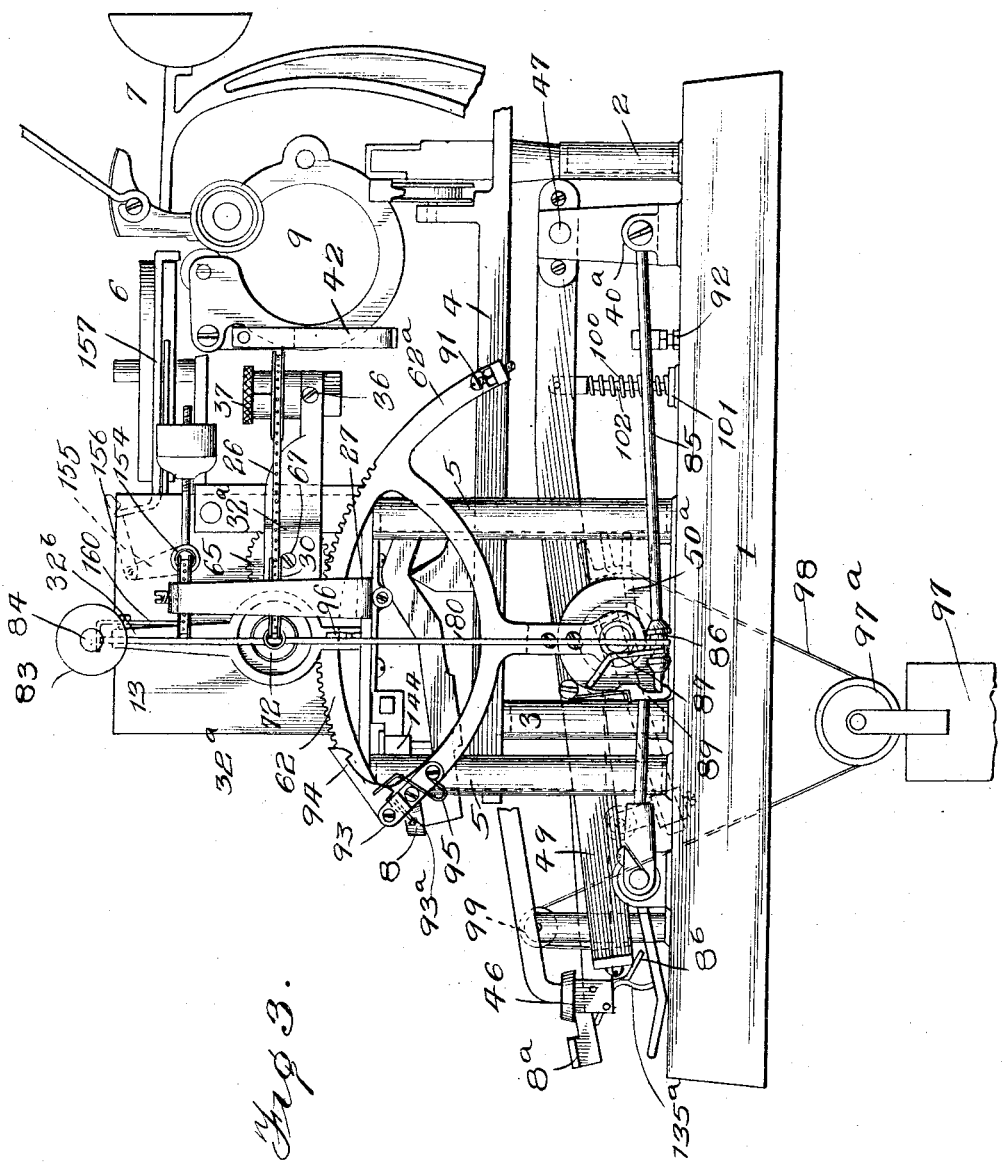

E. H. GUYER.
COMBINED TYPE WRITING AND COMPUTING MACHINE.
APPLICATION FILED JUNE 2, 1908.

1,137,754.

Patented May 4, 1915.
12 SHEETS—SHEET 4.

Witnesses
W. Krann
R. S. Gehr

Inventor
Edward H. Guyer
By H. H. Bliss
Attorney

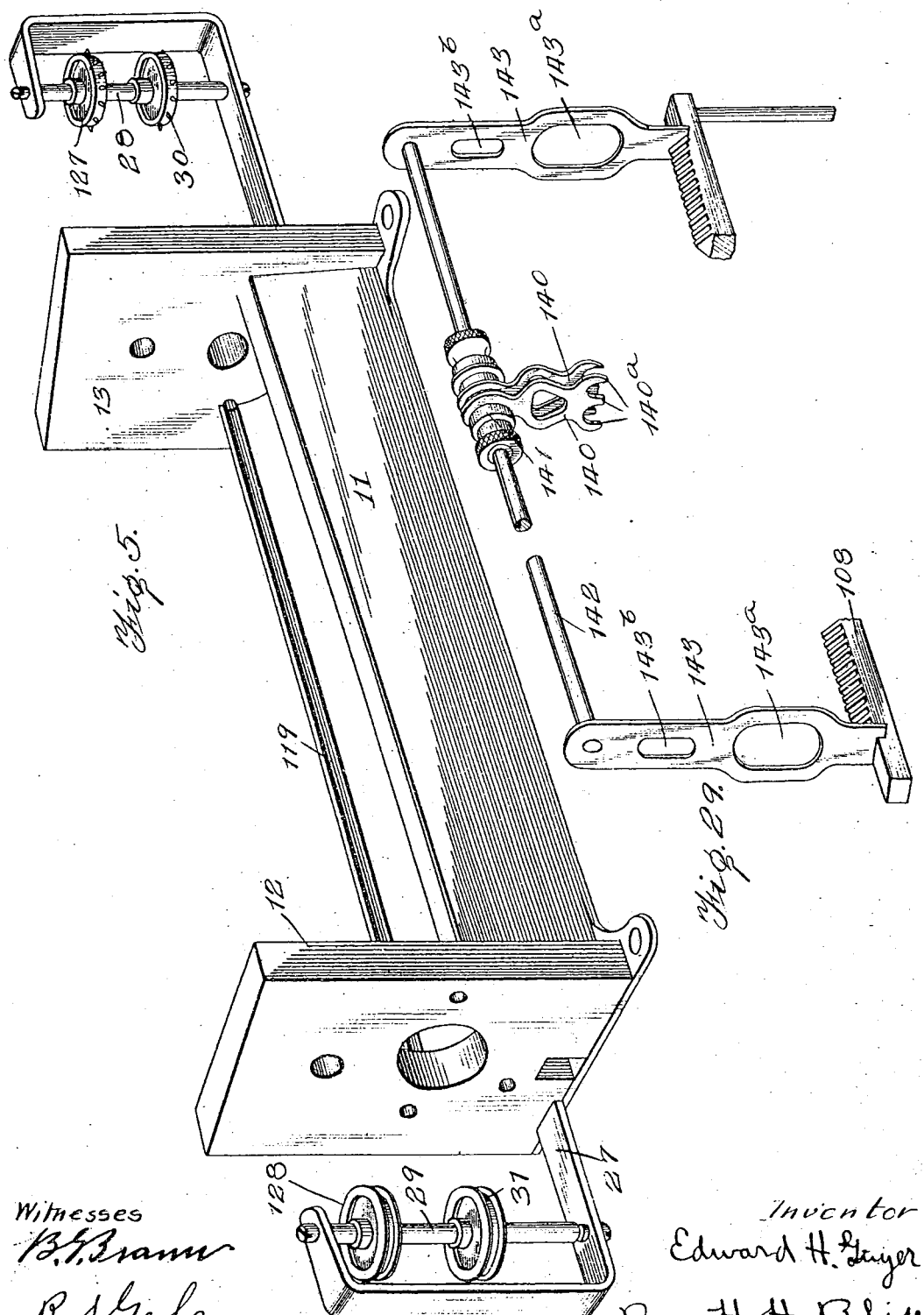

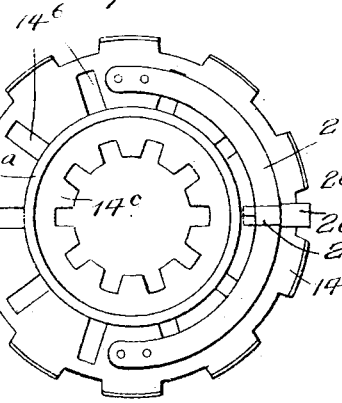
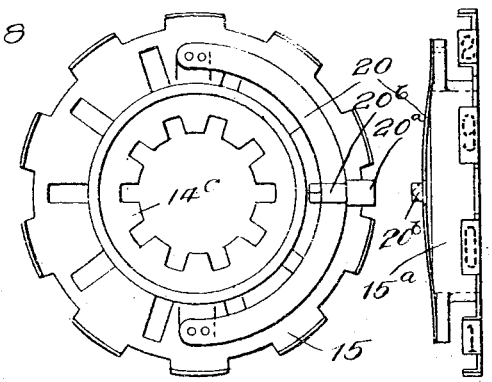
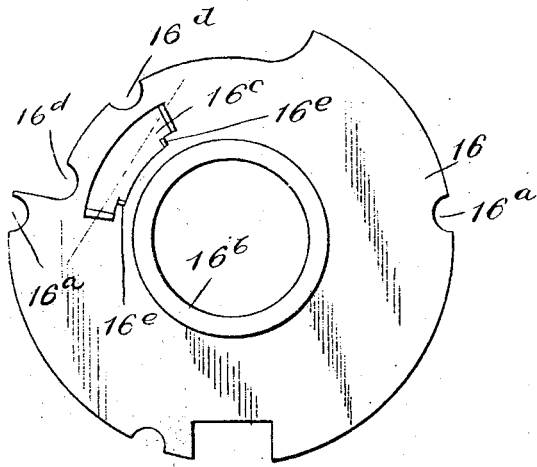
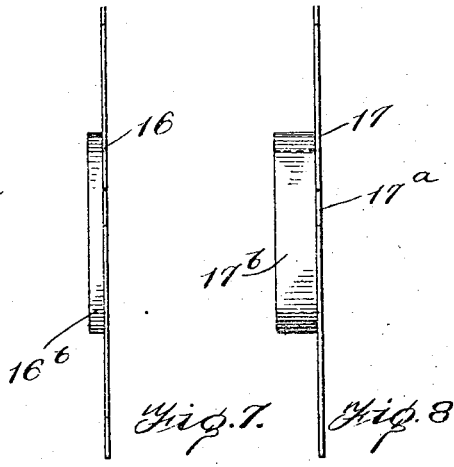
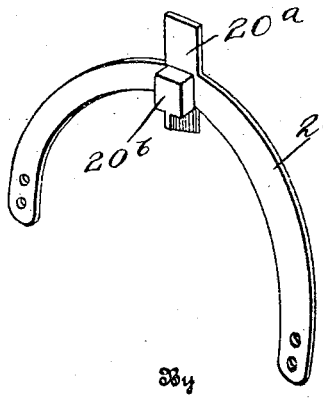

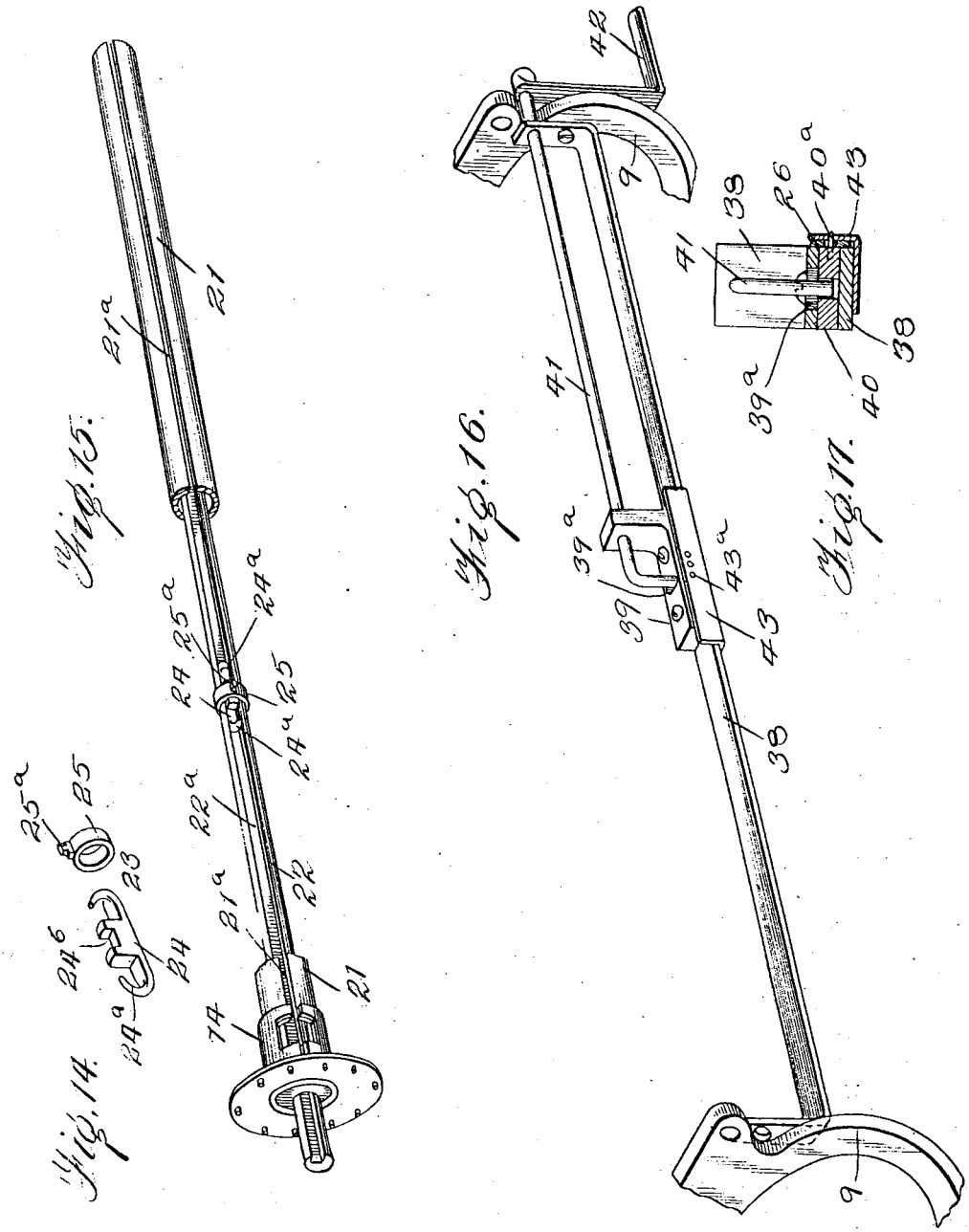

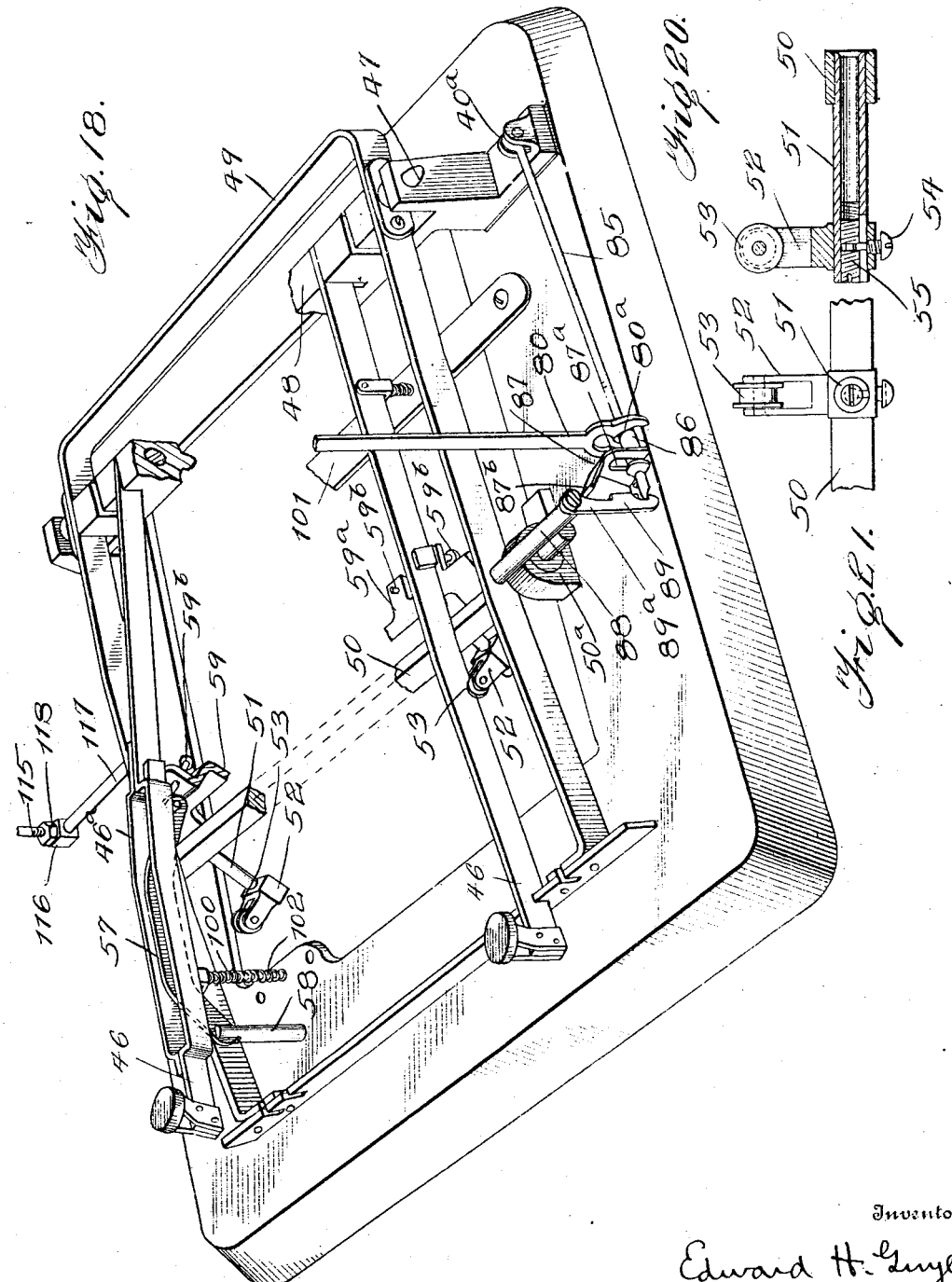

E. H. GUYER.
COMBINED TYPE WRITING AND COMPUTING MACHINE.
APPLICATION FILED JUNE 2, 1908.
1,137,754.
Patented May 4, 1915.
12 SHEETS—SHEET 9.
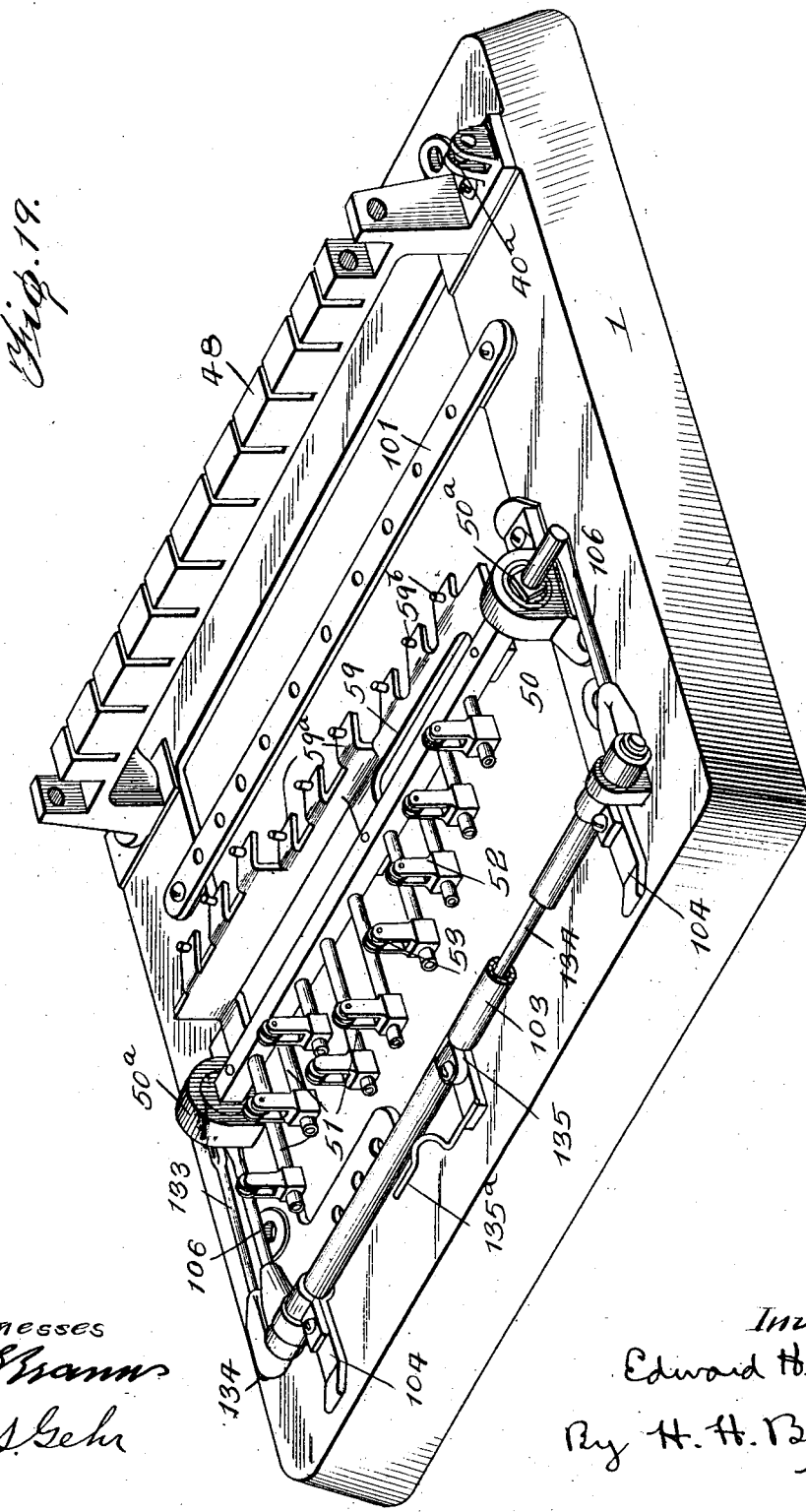
Witnesses
Inventor
Edward H. Guyer
By H. H. Bliss
Atty.

E. H. GUYER.
COMBINED TYPE WRITING AND COMPUTING MACHINE.
APPLICATION FILED JUNE 2, 1908.

1,137,754.

Patented May 4, 1915.
12 SHEETS—SHEET 10.

Inventor
Edward H. Guyer
By H. H. Bliss
Attorney

Witnesses
B. F. Cram
R. S. Gehr

E. H. GUYER.
COMBINED TYPE WRITING AND COMPUTING MACHINE.
APPLICATION FILED JUNE 2, 1908.
1,137,754.
Patented May 4, 1915.
12 SHEETS—SHEET 11.
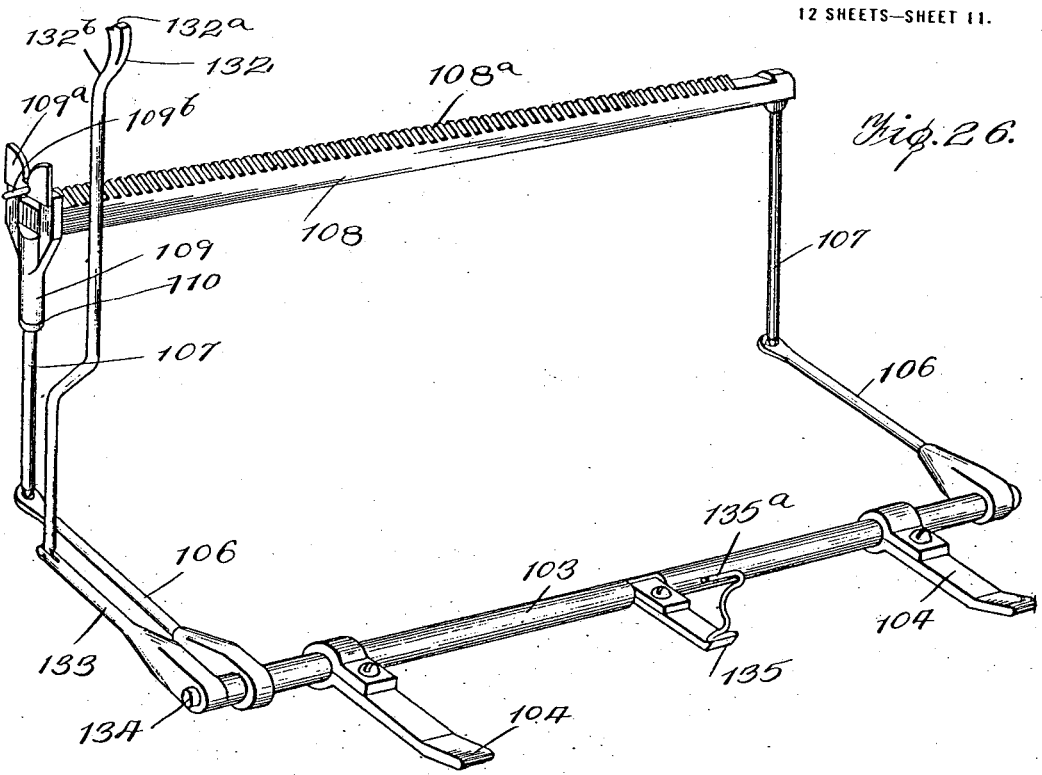
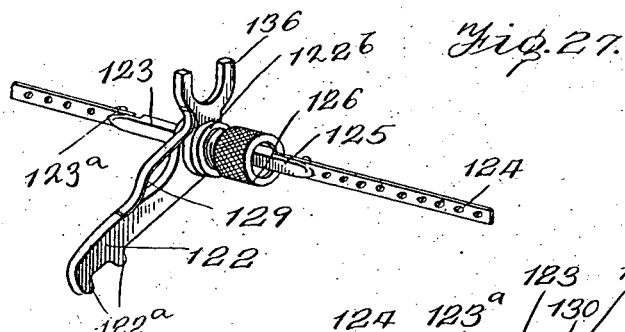
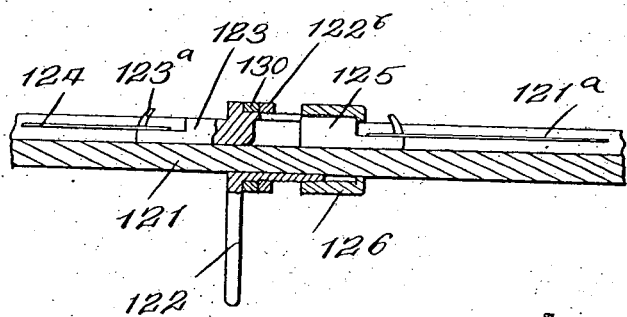
Witnesses
Inventor
Edward H. Guyer
By H. H. Bliss
Attorney

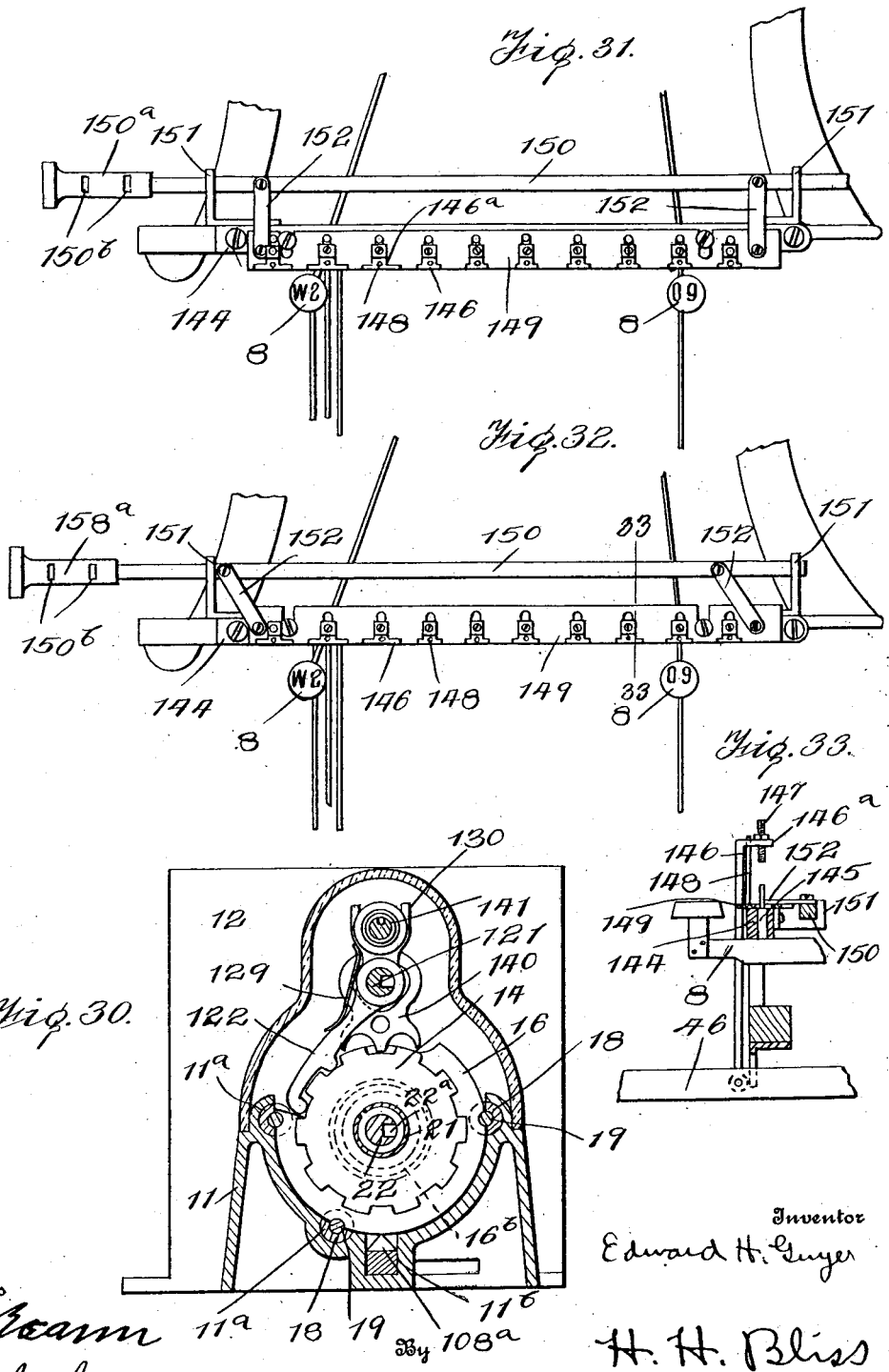

UNITED STATES PATENT OFFICE.

EDWARD H. GUYER, OF ROCK ISLAND, ILLINOIS.

COMBINED TYPE-WRITING AND COMPUTING MACHINE.

1,137,754. Specification of Letters Patent. Patented May 4, 1915.

Application filed June 2, 1908. Serial No. 436,310.

*To all whom it may concern:*

Be it known that I, EDWARD H. GUYER, a citizen of the United States, residing at Rock Island, in the county of Rock Island and State of Illinois, have invented certain new and useful Improvements in Combined Type-Writing and Computing Machines, of which the following is a specification, reference being had therein to the accompanying drawings.

This invention relates to what I term a combined typewriting and computing machine, that is a machine which combines the functions of the typewriter and the computing machine, in a manner such that numbers registered and added or subtracted by the computing mechanism, are simultaneously recorded on the paper by the typewriting mechanism, the latter being capable as well of doing the work of the regular typewriting machine. A machine of this character, in order to fully meet the widely varied conditions of service should be capable of performing in the usual way to which operators are accustomed, all the functions of standard typewriting machines, of accurately adding or subtracting numbers of great magnitude, and of performing its writing operations and its computing operations either conjointly or independently at the will of the operator. Furthermore, the relations and connections of the recording and registering mechanism should be so flexible that the recording both of registered numbers and of ordinary typewriting can be effected on any part of the paper.

The general object of this invention is to produce a machine to meet these requirements having a minimum number of operating parts and free from the frail and unreliable construction that has characterized the machines of this type with which I am familiar.

The manner of attaining this, as well as other more specific objects, will clearly appear in the following particular description in connection with the drawings which illustrate a practical embodiment of the invention.

Figure 1 is a plan view of the machine. Fig. 2 is a front elevation. Fig. 3 is a right end elevation. Fig. 4 is a left end elevation. Fig. 5 is a perspective view of a portion of the dial supporting frame and the pulley frame. Fig. 6 is a face view of one of the dial supporting disks. Figs. 7 and 8 are edge views of the same, the former showing a short and the latter a long bearing collar. Fig. 9 is a face of one of the dials. Fig. 10 is an edge view of the same. Fig. 11 is a face view of one of the dials showing a modified construction adapted for use with the form of supporting disk shown in Fig. 8. Fig. 12 is an edge view of the same. Fig. 13 is a perspective view of one of the carrying pawls. Fig. 14 is a detail perspective of the shuttle. Fig. 15 is a perspective view showing a portion of the quill, the stationary shaft, shuttle, and locking wheel. Fig. 16 is a perspective view of the band clutch Fig. 17 is a transverse section through said clutch. Fig. 18 is a perspective view of the machine base and some of the parts more or less directly mounted thereon. Fig. 19 is a perspective view of the base showing the segment rock shaft and other parts in detail. Figs. 20 and 21 show one of the segment rock shaft arms, the former in longitudinal section and the latter in end elevation. Fig. 22 is a vertical, longitudinal section of the quill bearings, and clutch mechanism. Fig. 23 is a plan view of the clutch and associated gearing. Fig. 24 is a face view, and Fig. 25 an edge view of the sliding clutch element. Fig. 26 is a perspective view of the dial alining devices and a portion of the means for operating the dial releasing dog. Fig. 27 is a detailed perspective of said dog. Fig. 28 is a longitudinal section of the same. Fig. 29 is a perspective view of the overthrow detents, and their supporting frames. Fig. 30 is a transverse section through the dial supporting frame. Figs. 31 and 32 are plan views of the link shifting devices showing the parts in their two characteristic positions. Fig. 33 is a transverse section taken on the line 33—33, in Fig. 32. Fig. 34 is a perspective view of the ribbon shifting mechanism.

In designing my machine, I have availed myself of the experience of typewriter makers, and it will be observed on referring to the drawings that the typewriting mechanism comprises the structure of one of the standard typewriting machines. Inasmuch as the details of construction of this typewriting machine are generally well known, it will be unnecessary for me to refer to them particularly in the description which follows.

Referring in detail to the construction illustrated, 1 is the machine base. 2—2 and 3—3 are rear and front pillars rising from the base to support the frame 4 of the typewriting mechanism. 5—5 are pillars rising from the sides of the base 1 to support the framework of a portion of the computing mechanism, all of the pillars referred to consist preferably of tubes and tie bolts as indicated. 6 designates the type wheel, 7 the printing hammer, 8 the key levers of the typewriting mechanism, 8ª the spacing lever, 9 the paper carriage, and 10 the ribbon mechanism, all of these parts being essentially of the well known standard construction.

*The dial mechanism.*—In this machine the operations of addition and subtraction are effected by means of a series of disk shaped dials arranged side by side and carrying the numerals on their peripheral edges. The supporting frame of the dial mechanism rests upon the pillars 5—5. This frame comprises a base 11 (see Figs. 5 and 30) and upstanding end plates 12 and 13. The upper face of the base 11 is concaved to receive the lower part of the dials 14 and 15 and the dial supporting and spacing disks 16 and 17. (See Figs. 6 and 12.) The concaved face of the base is longitudinally grooved or recessed at 11ª (see Fig. 30) to receive and rigidly support tubes 18 and core rods 19. Each of the tubes 18 is formed with a series of evenly spaced transverse slots. A series of dial supporting disks 16—17 have their edges entering the tube slots and are accurately centered and rigidly supported by the core rods 19, which engage notches 16ª—17ª formed in the edges of the disks. Each of the disks has a central, circular, aperture surrounded by a bearing collar 16ᵇ or 17ᵇ to support a dial. The dials 14, like the supporting disks, are formed of sheet metal, each disk having a series of equally spaced notches in its periphery. The teeth formed by these notches are bent laterally and the out-turned face of each displays a numeral, there being ten such teeth numbered 0 to 9, inclusive. Each of the dials is centrally apertured, the periphery of the aperture being notched to form a series of ten inwardly projecting teeth 14ᶜ in radial alinement with the numeral-displaying faces above referred to. These teeth are designed to be engaged by dial-turning devices later to be described. 14ª is a bearing collar or hub adapted to fit the outer face of the collar 16ᵇ of a supporting disk 16 and to rotate freely thereon.

20 is a spring carrying-pawl (see Fig. 13) which consists of a half ring of flat spring metal having a centrally arranged outwardly extending projection 20ª and in line therewith a laterally extending tooth 20ᵇ. This pawl has its ends rigidly secured, as by riveting, to the lateral face of the dial in a position such that the extension 20ª is disposed centrally of the notch between the numeral faces 9 and 0.

Just outside of the bearing hub 14ª are a series of ten rectangular perforations 14ᵇ in radial alinement with the peripheral notches of the dial and in circumferential alinement with the tooth 20ᵇ of the carrying pawl.

When one of the dials is in working position on its supporting disk, the tooth 20ᵇ of the carrying pawl is in circumferential alinement with an arcuate slot 16ᶜ in the supporting disk. This slot is in radial alinement with what may be termed the reading position of the dials, this position being intermediate the two notches 16ᵈ formed in the periphery of the disk and serving a purpose to be referred to later. As the dial rotates with respect to its supporting disk in the direction for addition the tooth 20ᵇ of the carrying pawl moves into the slot 16ᶜ as the numeral 9 moves from the reading position and numeral 0 comes into reading position, this lateral movement of the pawl being due to the spring action of its arms. In the case of subtraction, with the rotation in the opposite direction, the tooth 20ᵇ moves into the slot as the numeral 0 moves out of and numeral 9 moves into the reading position. As the tooth 20ᵇ moves into the slot it comes into engagement with one of the apertures 14ᵇ of the dial of the next higher denomination and carries it forward or backward, as the case may be, one point. As the tooth of the carrying pawl nears the end of the slot 16ᶜ in the carrying operation, the inwardly extending beveled projection of the tooth 20ᵇ engages one of the two beveled faces 16ᵉ and the tooth is thus lifted from the slot. The distance between the beveled surfaces 16ᵉ corresponds to 36 degrees of angular movement of the dial so that a movement of one point for the dial of next higher denomination is thus insured.

It is customary in writing numbers to separate the numerals in groups of threes, as a matter of convenience in reading either by the use of commas or by spacing. I employ the latter method. Accordingly the construction of every third dial and its supporting disks is slightly varied, the supporting disks 17 (see Fig. 8) being provided with a bearing collar 17ᵇ wider than that of the disks 16, and the dial 15 being provided with a correspondingly wide bearing hub 15ª. (see Fig. 12) the width of the bearing collars being such that a dial 15 and its supporting disk 17 occupy the space of two sets of dials 14 and supporting disks 16. Diametrically opposite lugs are formed on the hub 15ª to support the carrying pawl 20 in position to engage the adjacent dial supporting disk.

Referring now to the dial turning devices, 21 is a quill extending concentrically through the apertures in the series of dials and dial supporting disks and rotatably supported in suitable bearings at each end. (See Figs. 1, 2, 15, 22 and 30.) A longitudinal slot 21ª extends throughout the greater part of the length of the quill, being designed to receive a projecting part of the shuttle.

22 is a rigidly supported shaft extending through the quill 21 and provided with a rectangular groove 22ª extending throughout its length. This shaft and the surrounding quill are designed to guide and turn a shuttle indicated as an entirety by 23, and comprising a body part 24 and a collar 25. (See Figs. 14 and 15.) The body part 24 has hooked ends 24ª and a central notch 24ᵇ having a width equal to the width of the collar 25. The latter carries a laterally projecting lug 25ª. When the quill, solid shaft and shuttle are assembled as is shown in Fig. 15, the body part 24 of the shuttle lies in the groove 22ª of the shaft, while the collar 25 surrounds the shaft and body part 24 with the lug 25ª extending outwardly through the slot 21 of the quill. The arrangement is such that the collar is free to rotate with respect to the stationary shaft, but can move longitudinally only with the body part 24 of the shuttle, because the collar engages the notch 24ᵇ of said body part. The lug 25ª of the shuttle extends through the slot of the quill far enough to engage the inwardly extending teeth 14ᶜ of the dials, and by suitable rotation of the quill a dial engaged by the lug 25ª may be turned any desired number of points.

The longitudinal movement of the shuttle to bring it into engagement with the different dials is effected by means of a steel band 26 (see Figs. 1, 2, 3 and 4) attached at either end to one of the hooks 24ª of the shuttle and adapted to be connected intermediate its ends to the paper carriage of the machine.

27 is a pulley supporting frame (see Fig. 5) in the form of a bar which extends through the base 11 and has its ends bent at right angles, as indicated in the drawings to form suitable bearing supports for the spindles 28 and 29, said spindles being supported preferably on adjustable pivot points.

30 is a sprocket wheel rigidly mounted on the spindle 28 and 31 is a grooved wheel similarly mounted on the spindle 29.

32 and 33 are brackets rigidly secured to the end plates 13 and 12, respectively. (See Figs. 1, 3 and 4.) The free end of the bracket 33 also the rearwardly extending arm of the bracket 32 are slotted to receive upright shafts 35 which are adjustably secured in position by means of the bottom nuts 36 and upon which are rotatably mounted grooved pulleys 34, the latter being secured in place by means of the top nuts 37.

The pulley frame 27 is so disposed that the peripheries of the sprocket wheel 30 and of the grooved pulley 31 are in line with the path of the shuttle along the groove 22ª of shaft 22. The steel band therefore lies in this groove throughout its length and on emerging therefrom at either end passes over the sprocket wheel 30 and pulley 31. The band is perforated throughout its length at regular intervals, the pitch of the perforations being equal to the letter space of the typewriter. These perforations engage the pin-like teeth of the sprocket wheel. From this sprocket wheel, on one hand, and from the grooved pulley 31, on the other, the band passes rearward over the grooved pulleys 34 between which it extends in close proximity to the bar 38 rigidly mounted on the paper carriage of the machine. (See Figs. 1, 3 and 16.) At the middle of this bar is secured a bracket 39 grooved on its lower face to receive a shifting clutch member 40 and having an up-turned arm in which is rotatably mounted one end of a rock shaft 41, the other end of said shaft being similarly supported at the right end of the carriage where it is provided with an operating handle 42. At its inner end the rock shaft 41 has a down-turned arm which projects through a slot 39ª in the rock shaft bracket to engage the clutch member 40. (See Fig. 17.) This clutch member carries on its front face a plurality of pins 40ª properly spaced to engage the perforations of the steel band. An angle clip 43 is secured to the bottom face of the bar 38 and is provided with a series of perforations 43ª opposite the pins of the clutch. Thus the steel band lies between the bar 38 and the clip 43 and when the clutch is thrown forward by turning the rock shaft 41, the clutch pins extend through the perforations of the band and into the perforations of the angle clip, thus securely locking the band to the paper carriage. With the shuttle and carriage thus connected, it is clear that the two will move in unison, and inasmuch as the distance between adjacent dials is equal to the letter space of the typewriting machine, it is clear that the shuttle will be moved from engagement with one dial to engagement with another upon each operation of the escape mechanism of the paper carriage. To secure with precision the proper position of the shuttle with respect to the dials, the pulley frame 27 is made longitudinally adjustable.

44 is a slotted arm carried by this frame adjacent the end plate 13, (see Fig. 2) and 45 is an adjusting screw threaded into the base 11 and having collars to engage said bracket. By turning the screw in one direction or the other the position of the frame, and consequently of the shuttle, can be nicely adjusted. It will be noted that the proper tension for the band is secured by adjusting the position of the pulleys 34.

*The quill operating mechanism.*—For the purpose of turning the quill and with it the dials, a series of key levers 46, ten in number, are provided. (See Figs. 1, 4 and 18.) The keys of the levers 46 display the numerals 1, 2, 3, 4, 5, 6, 7, 8, 9, and 0, reading from left to right. These key levers are disposed beneath the frame 4 of the typewriting mechanism, and are pivotally mounted at their rear ends on a hinge rod 47 which extends longitudinally through the slotted bearing block 48.

49 is a frame or bail which is also pivotally mounted on the hinge rod 47 and which has its front transverse bar disposed beneath the front ends of the key levers 46, said bar having its upper edge notched to receive the levers and give them lateral support.

50 is a rock shaft mounted at either end in ball bearings at 50ª and having a series of forwardly extending arms 51. (See Figs. 18 and 19.) These arms are preferably in the form of tubes forced through holes in the rock shaft and secured by having their ends expanded. Each arm carries at its outer end a standard 52 having a grooved roller 53 to engage one of the key levers 46. The standards are adjustably mounted on the arms 51, each carrying a set screw 54 which projects through a slot in the arm 51 to engage an adjusting screw 55, as is clearly indicated in Figs. 20 and 21.

The arms 51 are of different lengths so that an equal depression of different key levers will give to the rock shaft different angular movements. Thus the arm 51 engaged by the "9" key lever is designed to give the rock shaft an angular movement corresponding to a movement of nine points by one of the dials. Similarly the arm 51 that engages the "5" key lever causes the rock shaft to turn a distance corresponding to a movement of five points by one of the dials. To avoid the necessity of using unduly long rocker arms 51 in the case of the "1", "2", and "3" key levers, supplemental levers 57 are provided to coöperate with these key levers. The levers 57 are pivotally mounted at their front ends on standards 58 and are disposed between the off-set sections of the lever bars 46 and the similarly offset supplemental bars 46ª which are rigidly secured to the key levers. Each of the levers 57 carries at its rear end a transverse pin to engage the lower edges of the lever bar 46 and the supplemental bar 46ª. The levers 57 engage the rollers of the arms 51, and the leverage of the system is such in each case that the desired movement of the rock shaft is secured without unduly long arms 51.

To prevent overthrow of the rock shaft and consequent overthrow of the dial to which the motion of the rock shaft is transmitted, a limit stop is provided in the form of a plate 59 which is rigidly secured to the rock shaft. This plate is formed with a series of fingers 59ª corresponding to the key levers "1" to "9", and each finger carries an adjustable contact member preferably in the form of a screw 59ᵇ in vertical alinement with its corresponding key lever. The several fingers of the plate 59 are so disposed in relation to the axis of the rock shaft that upon the depression of any one of the keys the depressed lever and its corresponding contact screw carried by the plate 59 come into contact at the end of the desired movement of the rock shaft and thus positively prevent its further movement.

At its right end the rock shaft carries an armed hub 61 to which is rigidly secured the gear segment 62. (See Figs. 2 and 3.) This segment meshes with an idle gear 63 mounted on ball bearings carried by the forwardly extending arm 32ª of the bracket 32, see Figs. 22 and 23. It also meshes with a gear 65 rigidly mounted on a spindle 66 which is suitably supported on pivot screws 67 and 68 carried respectively by the bracket arm 32ª and the plate 13. At its inner end the spindle 66 carries a second gear 69, which in turn meshes within an idle gear 70 mounted on ball bearings 71 carried by the end plate 13.

The idle gears 63 and 70 are concentric with the quill 21, the latter being carried by a sleeve 72 formed with a ball race constituting part of the ball bearing 73 in the end of the bracket arm 32ª. At its other end the quill is carried by a similar sleeve 74 formed with a ball race constituting part of a ball bearing 75 in the end plate 12. The sleeve 72 is formed with diametrically opposite slots 22ª, as shown in Fig. 22, one of which slots engages a spline 21ᵇ on the quill 21, thus locking the two parts against relative rotation.

76 is a movable clutch element (see Figs. 24 and 25) comprising an outer ring portion 76ª having laterally extending beveled teeth 76ᵇ, radial arms 76ᶜ and a central hub part 76ᵈ. Arms 76ᶜ are of a width to enter the slots 22ª of the quill sleeve and to slide therein. The idle gears 63 and 70 carry ten lateral clutch teeth 63ª and 70ª, respectively, adapted to be engaged by the teeth 76ᵇ of the moving clutch element 76. It is clear that when the clutch 76 is in engagement with the idle gear 63 that the quill will be turned in one direction by the movement of the segment, and that when the clutch engages the gear 70 the quill will be turned in the opposite direction.

77 is a tubular spindle having a flange 77ª and a detachable collar 77ᵇ between which the hub of clutch 76 is rotatably secured. The inner end of the spindle 77 slidably engages in a centering sleeve or bushing 78 (see Fig. 22) which supports the right end of the stationary shaft 22, the left end of said shaft being rigidly carried by the bracket 79, on the end plate 12. (See Figs. 1, 2 and 4.) The outer end of the spindle 77 passes through a hole in the end of the quill sleeve and is guided thereby. The outwardly projecting end of the spindle is notched at 77ᶜ to engage the swinging lever arm 80 which is pivotally mounted at 81 on the upstanding arm 32ᵇ of the bracket 32. A weight arm 82 is pivoted to the upper end of the lever 80 with freedom to swing through about 180°, the pivoted end of the arm 82 being forked so as to form shoulders that engage the sides of the lever 80 to limit the relative movement of the weight arm and said lever. A weight 83 is threaded upon the arm 82 and may be locked in any desired position by means of the tubular nut 84. When the lever 80 is in a vertical position the clutch 76 is in an intermediate position and out of engagement with both of the idle gears 63 and 70. The weight arm 82, however, tends to move the lever 80 to the left or to the right according as said weight arm is to the right or the left of its pivotal support on the end of lever 80. Hence the weight arm tends to keep the clutch in engagement with one or the other of the idle gears 63 and 70.

The lower end of the swinging lever 80 is forked, as clearly indicated in Fig. 18, so as to form inclined cam surfaces 80ª which terminate at their upper ends in a circular notch, the opening of which is somewhat less than its diameter. 85 is a lever bar pivotally mounted at its rear end upon an extension of the bearing block 48. Near its front end this lever bar is provided with collars between which is mounted an antifriction roller 86 adapted to engage the cams 80ª of the lever 80, one or the other of said cams being pressed against the roller 86 by the action of the weight arm 82.

87 is an upstanding bracket mounted on the machine base and provided with a vertical slot 87ª through which the front end of the lever bar 85 projects and by which it is guided. The bail 49 carries at one side a rigid arm 88 upon which is pivoted a depending hook 89 adapted when the bail is depressed to engage the end of the lever 85 and to lift the same as the bail returns to normal position. The hook 89 is provided with a cam surface 89ª adapted to engage a contact arm 87ᵇ formed on the bracket 87 as the hook rises so as to disengage the hook from lever 85 at the time it enters the circular notch of the clutch shifting lever 80.

90 is a spring which yieldingly presses the lower end of the hook forward to insure engagement with the lever 85 and with the bracket arm 87ᵇ.

With the parts thus constructed and arranged, it will be seen that when the bail 49 is depressed by a key lever, the hook 89 is brought into engagement with the front end of lever 85 and as the bail rises the lever 85 is lifted. During this movement of lever 85 it engages one or the other of cams 80ª of lever 80 so that the latter is swung into an intermediate or vertical position which corresponds to the inoperative position of clutch 76. As the lever reaches this position the roller 86 carried by it enters the circular notch of lever 80. At the same time hook 89 is moved out of engagement with lever 85 and the latter is left in engagement with the circular notch 80 (being prevented from falling from said notch by the lateral pressure of lever 80 due to weight arm 82) during the return of the segmental gear 62 to its normal position. Disengagement of levers 80 and 85 is then effected by the following devices: The segment 62 carries a rearwardly extending outturned arm 62ª in which is mounted an adjustable contact screw 91, said screw being disposed in vertical alinement with the lever 85. (See Fig. 3.) 92 is a stop mounted on the machine base in position to engage the arm 62ª of the segment when the latter returns to normal position. Contact screw 91 is designed to be so adjusted as to come into contact with the lever 85, the latter being in its raised position, slightly before the arm 62ª of the segment engages the stop 92. At its front end the segment 62 carries a bracket 93 on which is pivotally mounted a locking hook 94. (See Figs. 1, 2 and 3.) 95 is a spring which presses the hook yieldingly against the adjustable screw 93ª carried by the bracket 93. 96 is a notched arm rigid with the lever 80 and projecting through a guiding slot 32ᶜ formed in the lower side of the bracket 32, see Figs. 3 and 23. The locking arm 96 is of such length that its toothed end is disposed in the path of the hook, when the lever 80 is in its vertical position, that is to say, when the clutch is disengaged from both of the idle gears 63 and 70. The segment is thus locked against forward movement so long as the clutch is not in engagement with one or the other of the idle gears.

To insure the prompt return of the segment and bail to normal position, after the depression of one of the key levers 46, a weight 97 is suspended from the bail and the limit stop plate 59. This weight preferably is provided with a grooved roller 97ª to receive a cord 98 or other flexible element which is attached at one end to the limit stop 59, and at the other end to the front cross bar of the bail. A guide pulley 99 is interposed between the weight and the bail to secure an upward pull on the latter.

The key levers 46 are returned to normal position by springs 100, one of which is interposed between each lever and the plate 101, a pin 102 pivotally connected to the lever and passing through a perforation in the plate 101 being preferably used to keep the spring in position. (See Figs. 3 and 18.) This construction is modified, it will be noted, in the case of the first three key levers, the springs being carried by the supplemental levers 57, as shown in Fig. 18.

*The dial alining and locking devices.*—To more fully insure the accurate positioning of the dials when turned by the depression of the key lever, I provide special alining devices, and to prevent movement of the quill during the return of the segment to its normal position, I provide locking devices which engage the quill during such return of the segment.

103 is a tubular rock shaft mounted on the base 1 beneath the key levers 46. (See Figs. 1, 2 and 19.)

104 are forwardly extending arms carried by this rock shaft in position to be engaged by knife edge contacts 105. The latter are preferably carried on threaded shanks 105ª adjustably mounted in the front cross bar of the bail, the construction being such that the contact edges may be adjusted forward or rearward with respect to the vertical plane of the rock shaft. (See Fig. 4.) On the ends of the rock shaft 103 are mounted rearwardly extending arms 106. At their free ends these arms have upturned sockets to receive the lower ends of the upright rods 107.

108 is a transverse bar supported at its ends on the uprights 107, and guided in the straight sided groove 11ᵇ extending longitudinally of the base 11, see Figs. 26 and 30. The upper face of this bar is provided with triangular teeth 108ª of a thickness adapted to enter the notches or openings between the numeral displaying faces of the dials. When the rock shaft 103 is turned at the end of the downward movement of the bail, the alining bar 108 is lifted and the beveled faces of the teeth 108ª engage the dials and bring them into accurate alinement.

On the upright 107 at the left of the machine a sleeved locking bolt 109 is slidingly mounted, said bolt being supported by the adjustable nuts 110. The upper end of this bolt is forked to embrace the end of the alining bar 108 and carries a notched plate 109ª with a laterally projecting pin 109ᵇ.

111 is a locking wheel rigidly mounted on the quill sleeve 74, see Figs. 14 and 22, and is provided with ten laterally projecting pins or teeth 111ª adapted to be engaged by the notched plate 109ª of the locking bolt. 112 is a lever arm pivoted at 113 on the end plate 12 and provided with a slot near its front end to engage the pin 109ᵇ of the locking bolt 109. This lever arm is pressed yieldingly downward by the spring 114 mounted on the bracket 33. (See Fig. 4.)

115 is an upright rod disposed directly beneath the lever arm 112, being threaded at its lower end for adjustable connection with a supporting socket 116, the latter being carried on the arm 117 which extends laterally from the side bar of the bail 49. A lock nut 118 serves to secure the upright rod 115 in adjusted position, which is such that when the bail is in its normal position, the upper end of rod 115 presses against the lower side of lever 112 to hold the locking bolt 109 in engagement with one of the pins of the locking wheel.

119 is a depending hook pivotally secured by means of the screw 119ª and spacing sleeve 119ᵇ to the end plate 12; and having its notch or hook proper disposed adjacent the front lower corner of the lever arm 112. The lower end of this hook is provided with a beveled or inclined edge which coöperates with the inturned end of the horizontal arm 120 carried by the upright rod 115. The relation of the parts is such that the arm 120 normally holds the hook out of engagement with the lever arm 112, but permits it to swing into engagement therewith upon the first part of the downward movement of the bail.

*The dial releasing dog.*—With the dials and carrying pawls constructed as previously described, it is necessary to provide some means to prevent the live dial, that is, the one engaged by the shuttle, from carrying with it one or more of the dials of lower denomination, this action being possible if the adjacent dial of lower denomination happens to be in position with its carrying pawl in the slot 16ᶜ of the interposed supporting disk.

A rock shaft 121, formed with a rectangular groove throughout its length, is mounted directly above the dials with bearing supports in the end plates 12 and 13. 122 is a pawl or dog having at its free end engaging teeth 122ª, and at its other end formed with a boss or sleeve to slidingly engage the rock shaft 121. (See Figs. 27 and 28.) The teeth 122ª are flat at their right sides and beveled on their left sides and normally lie in the notches 16ᵈ of the dial carrying disks 16. These notches 16ᵈ lie adjacent the ends of the arcuate slot 16ᶜ of each disk so as to laterally expose the extension 20ª of the adjacent carrying pawl 20, when the latter is in either of the two positions of rest which it may occupy while its tooth 20^b lies in the slot 16^c.

The boss or sleeve of the dog 122 carries a rigid spline 123 which lies in the rectangular groove of the shaft 121, and which has a hooked end 123^a to receive one end of a perforated steel band 124. 125 is a loose hook member adapted to receive the other end of said steel band and secured to the dog 122 by means of the flanged collar 126 which is threaded upon the sleeve of the dog. The steel band 124 lies within the rectangular groove of the shaft 121 throughout the length thereof, passing at the right over a sprocket wheel 127 mounted on the upright spindle 28, thence transversely of the machine to the grooved pulley 128 carried by the spindle 29. In assembling the parts the desired tension of the steel band is obtained by adjustment of the threaded collar 126.

The dog 122 is normally pressed downward by spring 129, so as to bring its engaging teeth 122^a in line with the notches 16^d of the pawl carrying disks 16. The spring 129 is mounted upon the fork 130, the latter being rotatably secured upon the sleeve of the dog between the face of the dog arm and a detachable securing nut or collar 122^b. The fork is prevented from turning by reason of its engagement with the collar of the overthrow detents which presently will be described.

It is clear that the sprocket wheel 127 will move the steel band 124 and with it the dog 122 in unison with the paper carriage and the shuttle 23. The parts are assembled so that the dog 122 is always just one space to the right of the dial engaging lug 25^a of the shuttle 23. Consequently as the shuttle moves into engagement with the dial next to be turned, the dog 122 moves into position above the adjacent dial of next lower denomination and one or the other of its teeth 122^a at the same time engages the pawl extension 20^a of the last-mentioned dial in case it is in position to bring said extension in line with either of the notches 16^c of the dial supporting disk. By this engagement the dog withdraws the tooth 20^b of the pawl from engagement with the live dial; that is to say, the dial next to be turned. Before the dog 122 can move another step to the right, it must be lifted to disengage it from the pawl projection 20^a and to this end I provide the following mechanism.

The left end of the rock shaft 121 projects through the end plate 12 to receive an arm 131 which normally rests upon the spacing sleeve 119^b of the depending hook 119. 132 is a lifting pawl having its free end notched at 132^a to engage the end of the rocker arm 131. This pawl is pivotally connected at its lower end to the arm 133 of the rock shaft 134, the latter being pivotally mounted in the tubular shaft 103. See Fig. 26. The latter shaft is partially cut away in its middle part to permit the connection of an arm 135 with the inner shaft 134. The arm 135 carries an extension 135^a which projects into the path of the space bar 8^a of the machine. The space bar in turn carries an extension 8^b which projects into the path of the bail, so that the space bar is depressed by the latter part of the downward movement of the bail, the carriage escape mechanism operating at the very end of such movement. (See Figs. 3 and 26.) With this construction, the shaft 134 is rocked both by the depression of the space bar and by the depression of the bail. The rocker arm 133 carries an adjustable stop screw 136 to limit the downward movement of pawl 132. (See Fig. 4.) Near its upper end the lifting pawl is bent to form a cam surface 132^b which cooperates with a rigid pin 79^a projecting from the face of the plate 12.

137 is a spring for maintaining cam 132^b in yielding contact with the pin 79^a. This spring is carried by a collar 138 which is adjustably secured to the bracket 79 by a screw 139. By loosening the screw the collar may be turned to properly position the spring and then be secured rigidly in position by tightening the screw. The relation of the parts is such that the cam 132^b forces the pawl out of engagement with the arm 131 after a slight upward movement of the latter. This upward movement of the arm 131 causes a similar lifting of the dog 122 and this is timed to occur an instant before the escape mechanism of the paper carriage operates to permit the movement of said carriage. It is clear therefore that the momentary lifting of the dog releases the carrying pawl which may have been engaged by one of the dog teeth and permits the dog to move in unison with the paper carriage one space to the right, engaging in such movement the pawl extension of the dial over which it moves in case such extension chances to be in the path of either of the dog teeth.

Since the dog 122 is maintained one space to the right of the dial engaging lug of the shuttle, and is consequently always found directly over the dial of next lower denomination than the live dial, it serves as a pointer to indicate the live dial. When the pointer is moved to the left by the return movement of the carriage, the dog rises automatically over the pawl projections 20^a that may be in its path by reason of the beveled conformation of the left faces of the dog teeth 122^a.

*The overthrow detents.*—Overthrow of the live dial is prevented by the limit stop carried by the segment rock shaft, which has been described above. But it is also desirable to provide means to prevent the overthrow of the carried dial. To this end I provide the two detent segments 140, which are pivotally carried on a sleeve 141. (See Figs. 29 and 30.) This sleeve is carried by a frame comprising a transverse rod 142 upon which the sleeve is slidingly mounted, and upright end plates or bars 143 which are notched at their lower ends to engage the aliner bar 108. The end plates are slotted at 143$^a$ to embrace the quill and at 143$^b$ to receive the rock shaft 121. Mounted in this manner the frame is guided for vertical movement in unison with the aliner bar 108, when the latter is forced upward by the depression of one of the computing keys in the manner previously described.

The segments themselves are slotted to permit the passage through them of the rock shaft 121 and at their lower ends are formed with three dial engaging teeth 140$^a$. With the dial in a normal position of rest, the middle one of the three teeth 140$^a$ projects into the space between two of the numeral displaying faces of the dial in position to be engaged as the dial is turned. Such engagement causes the oscillation of the segment, thus causing one or the other of the two outer teeth 140$^a$ to pass into the next adjacent notch in the dial. The movement of the dial is thus arrested, inasmuch as the oscillation of the segment is limited by engagement with the rock shaft 121.

The segment carrying sleeve is moved longitudinally of the rod 142 in unison with the dog 122 by the fork 130 carried by said dog, the fork engaging a suitable groove in the detent sleeve. This connection between the dog 122 and the sleeve of the overthrow detents is such that the detents are always maintained in position to engage the two dials of next higher denomination than the live dial. Two of the detent segments are necessary on account of the grouping of the dials with intermediate spaces, for a single segment would be inoperative when it fell in one of these intermediate spaces. With two segments, the engagement of one of them with the dial of the next denomination is always insured. Of course the use of a second detent segment might be avoided by making the width of the numeral displaying faces of the dials 15 equal to the width of the bearing hubs 15$^a$.

It will be understood that as the supporting frame of the detent segments is carried upon the aliner bar, said segments will be lifted with said aliner bar an instant before the escape mechanism operates to permit the carriage to move. The segments are thus lifted free from the dials at the proper moment for movement in unison with the dog 122. As the segments are lifted any one of them that has been previously rotated is restored to a vertical position by means of the rock shaft 121 bearing against the side of the triangular shaped opening in the segment, so that the center tooth of the segment is in position to engage the notch of the next dial of lower denomination.

*The type lever connections.*—In order that the numerals registered by the dials by the depression of the computing key levers 46 may be printed on the paper simultaneously with such key depressions, I provide means for connecting the computing key levers with the numeral key levers of the typewriting mechanism proper, the latter being in the uppermost row of the bank.

144 is a transverse bar rigidly mounted on the typewriter frame directly above the upper row of key levers. (See Figs. 31, 32 and 33.) This bar is provided with a series of vertical holes one above each of the key levers of the upper row in which holes are slidingly mounted plungers 145, each having its lower end resting upon the upper edge of the key lever beneath. An upstanding connecting link 146 is pivotally secured to each of the computing key levers 46, and each of these links is formed at its upper end with a rearwardly turned flange 146$^a$. Each of these flanges carries an adjustable contact screw 147 adapted to engage one of the plungers 145. Each of the flanges is also perforated to receive one of a series of upstanding guide pins 148 which are carried upon a sliding plate 149. This plate is provided with slots through which the plungers 145 project and the plate is free to move forward and back a distance corresponding to the length of these slots. This movement is effected by a longitudinally sliding shifting rod 150 mounted in brackets 151 and connected by means of links 152 with a sliding plate 149. The shifting rod is provided at its left end with a handle 150$^a$ by which the rod may be moved. This handle is formed with two locking notches 150$^b$ adapted to be engaged by a locking detent 153 to secure the plate 149 in either of its extreme positions. When said plate is drawn back, the contact screws 147 are in vertical alinement with the plungers 145, so that the depression of the computing key levers 46 causes the depression of the corresponding numeral key levers in the upper row. When the plate 149 is thrown forward said screws are out of alinement with the plungers and the levers in the upper row consequently are not effected by the depression of the computing levers.

*Ribbon shifting mechanism.*—In order that the totals may be distinguished from the component items, I prefer to print them in different colored ink, and to this end provide ribbon shifting devices connected with the computing mechanism in such a way that the ribbon will be automatically shifted, say from black to red, when the total is set down.

154 is a tubular rock shaft mounted in the end plates 12 and 13 and carrying near its middle an upstanding arm 155 to which is pivotally secured a hook 156. (See Fig. 34.) This hook engages the upstanding bail 157ᵃ of the ribbon shifting lever 157, which is regularly supplied as a part of the standard typewriting mechanism illustrated. At its right end the rock shaft 154 carries a forwardly extending arm 159 adapted to be engaged by the cam surface 160ᵃ of the lever 160. This lever is mounted on the pivot which carries the swinging lever 80, and at its upper end is provided with the bent arms 160ᵇ. These arms are disposed in position to be engaged by the weight arm 82. When said arm is thrown to the right, the cam 160ᵃ is moved to the left, thus depressing the arm 159 and causing the ribbon to be lifted so as to bring a different color band into operative position. When the weight arm is turned to the left the cam 160ᵃ permits the arm to rise under the action of a weighted arm 161, thus returning the ribbon to its first position. It is to be noted that the hollow rock shaft 154 serves incidentally as a casing for the rear pass of the steel band 124.

*The operation of the machine.*—I shall now describe the operation of the machine assuming that the key connecting devices are in position to cause the proper printing operation when the computing key levers are depressed. Let it be assumed for example, that the numbers 7430 and 679 are to be added in column form and their total written below them. With the weight arm 32 thrown to the left to bring the clutch into engagement with the idle gear 63, and with each dial registering "0," the space bar of the machine is operated until the pointer lies over the dial corresponding to "hundreds," thus indicating the "thousands" dial as the live dial. With the dials in the position stated, the engaging tooth 20ᵇ of each carrying pawl lies in the slot 16ᶜ of its supporting disk and projects into engagement with the dial of next higher denomination, the pawl extensions 20ᵃ being alined in the upper series of notches 16ᵈ of the supporting disks 16. Therefore with the dog 122 in position above the "hundreds" dial its upper tooth 122ᵃ is in engagement with the pawl extension of the "hundreds" dial and holds the pawl out of engagement with the "thousands" dial, so that the latter may be turned without affecting the dials of lower denomination. The computing key lever numbered "7" is now depressed carrying with it the bail 49 and also engaging the roller 52ᵃ carried by the arm 51 of the rock shaft 50 in line with the lever so as to turn the rock shaft and swing the segment 62 forward. This turning movement of the rock shaft continues until the key lever comes in contact with the contact screw carried by the limit stop plate 59, the movement of both the key lever and the rock shaft being arrested by such contact. The forward movement of the segment causes an upward rotation of the gear 63, and as the clutch 76 is in engagement with said gear the rotation is transmitted through the clutch to the quill. The quill carries with it the lug 25ᵃ of the shuttle and inasmuch as the lug is in engagement with one of the interior teeth of the "thousands" dial, the latter is turned through seven points, the numerals 1, 2, 3, 4, 5, 6, and 7 appearing successively in the reading position. Near the end of the downward movement of the key lever, the front bar of the bail engages the spacing lever and through it the arm 135 of the rock shaft 134 which operates to lift the dog 122. Instantly after the lifting of said dog, with the continued depression of the bail, the printing hammer is thrown forward to press the paper against the type wheel, and an instant later, as the spacing lever is released with the beginning of the return movement of the key lever and bale, the escape mechanism operates to permit the carriage to move one space to the left, while the dog 122 moves the same distance to the right engaging the pawl projection 20ᵃ of the "tens" dial and withdrawing its pawl from engagement with the "hundreds" dial. It is to be noted that the turning of the "thousands" dial did not affect the adjacent dial of higher denomination, for the reason that the engaging tooth 20ᵇ of the "thousands" dial was lifted, at the very beginning of the dial movement, from engagement with the adjacent dial of higher denomination by the beveled face of the tooth 20ᵇ engaging the upper beveled face 16ᶜ of the supporting disk. At the end of the downward movement of the bail, the hook 89 carried by the bail arm 88 passes into engagement with the front end of the lever 85 and as the bail rises under the action of the depending weight 97, the lever 85 is lifted and inasmuch as it is guided by the bracket 87 so as to move in a vertical plane its roller 86, by engaging the left cam 80ᵃ swings the lever 80 to vertical position, thus disengaging the clutch 76 from the gear 63. On this upward movement of the hook 89 its cam surface 89ᵃ is maintained in engagement with the flange 87ᵃ of the bracket 87, and the cam is so shaped that the hook is disengaged from the end of the lever 85 at the moment the roller 86 has fully entered the circular notch of the lever 80. The roller 86 is retained in the circular notch, by reason of the turning moment exerted by the weight arm 82 on the lever 80, during the return of the segment to its normal position, such return being effected by the pull of the weight 97 on the segment rock shaft. An instant before the arm 62ᵃ of the segment comes in contact with the stop 92, the contact screw 91 carried by said arm strikes the lever 85 and disengages the roller 86 from the circular notch of the lever 80, permitting lever 85 to fall and the lever 80 to swing to the right, thus bringing the clutch 76 again into engagement with the gear 65.

It is to be noted that the engagement of the key levers with the grooved rollers carried by the arms of the segment rock shaft is such as to permit the key lever to move away from the roller during the first part of the return movement of said lever and the bail. It is during this first part of the upward movement that the hook 89 lifts lever 85 so as to swing the lever 80 and disengage the clutch 76, the segment meanwhile being at rest. As soon as the clutch is disengaged however, the segment starts on its return movement under the action of the weight.

The quill 21 is normally locked against rotation by the bolt 109, which is pressed upward into engagement with the locking wheel by the pressure of the upright rod 15 upon the under side of the lever arm 112. But at the very beginning of the downward movement of a key lever and before any movement of the rock shaft, this pressure is relieved, this being possible by reason of the fact that the key levers normally stand slightly above and out of engagement with the rollers carried by the segment rock shaft. As soon as the upward pressure on the under side of the bolt lever 112 is relieved, the spring 114 throws said lever down, thus disengaging the bolt 109 from the locking wheel and permitting the quill to be turned by the segment. Near the end of the downward movement of the bail the arms 104 of the rock shaft 103 are engaged and depressed, thus lifting the rearwardly extending arms 106 which carry the uprights 107 and the alining bar 108, the engagement of the latter with the dials serving to bring said dials into accurate alinement. The upward movement of the left hand rod 107 also serves to bring the contact nuts 110 into engagement with the locking bolt 109, thus lifting the latter into locking position. As the bolt and with it the lever 112 rises to the locking position, the depending hook 119 swings rearward into engagement with the lower corner of the lever 112, thus holding the bolt in locking position during the upward or return movement of the key lever bail and segment. As the bail nears the end of its return movement, the arm 120 engages the beveled surface at the lower end of the depending hook to disengage it from lever 122. The latter however is prevented from lowering and retaining the bolt in unlocked position because the upright 115 immediately engages the under side of said lever and by its upward pressure holds the bolt in locking position. Continuing the operation, the computing lever "4" is now depressed and the "hundreds" dial, which is now the live dial, as indicated by the position of the dog 122, is thereby turned through four points and the numeral "4" printed upon the paper, the operation of the various parts of the mechanism being similar to that described in connection with the "thousands" dial. In the same manner the key lever "3" is depressed to turn the "tens" dial through three points and print the numeral "3". Finally the "0" key lever is depressed, but as the segment rock shaft is provided with no arm to be engaged by this lever, the "units" dial is not moved, the operation of the mechanism in other respects however being the same as in the case of the other dials. The number 7430 has now been printed on the paper and is indicated by the dials. The line spacing devices of the paper carriage are now operated to move the paper forward, and the carriage is returned to the right until the dog 122, moving to the left, lies above the "tens" dial, indicating the "hundreds" dial as the live dial. The number 679 is now printed by the successive depression of the key levers "6", "7" and "9", which turns the "hundreds", "tens", and "units" dials through six, seven, and nine points respectively.

It will be observed that in turning the "hundreds" dial through six points, its numeral "0" is brought into the reading position. As it is moved through the last point, the engaging tooth 20ᵇ of its carrying pawl projects through the slot 16ᶜ to engage the "thousands" dial and advance it one step so as to read "8," thus effecting the carrying operation. Again in the case of the "tens" dial its movement through seven points causes the carrying in the same manner of the "hundreds" dial, the latter being advanced from "0" to "1." In each of the carrying operations the one or the other of the overthrow segments 140 is in position to limit the movement of the carried dial to one point.

After the depression of the key levers "6," "7" and "9," the dials are found to indicate the total 8,109, and in order to write this total the paper is moved forward one line space, the carriage returned to the right until the dog 122 lies above the "hundreds" dial, and then after turning the weighted lever 82 over to the right, so as to bring clutch 76 into engagement with the idle gear 70, the computing key levers "8," "1," "0," "9," are successively depressed. The shifting of the clutch into engagement with the gear 70 results in the turning of the quill in the opposite direction because the movement of the segment is now transmitted through the back gears 65 and 69, the former meshing with the segment and the latter with the idle gear 70. The effect then of depressing the computing key levers, last referred to, is to print the total, 8109, and at the same time to subtract this number on the dials, thus returning them to "0."

It will be understood that by throwing the weight arm 82 over to the right, the lever 80 has its outside cam 80ª moved into engagement with the roller 86 of the lever 85 and that the lifting of the latter lever shifts the clutch to the central position out of engagement with the gear 70 in precisely the same manner as it is shifted from engagement with the gear 63. By throwing the weighted lever 82 to the right, the ribbon shifting mechanism is operated bringing the red band of the ribbon into operative position so that the total is distinguished by being written in red.

In the manner above described any number of items may be added, so long as the capacity of the machine is not exceeded, the numbers being simultaneously recorded on the paper. Further, the items may be recorded on any part of the paper not only in column form, but in any other form which typewriting machines are capable of producing, this being possible by reason of the fact that the clutch carried by the paper carriage permits the steel shuttle band to be locked to the carriage in any position of the latter.

It is thought that the operation of subtracting will be readily understood from the above description. Thus if the smaller of the two numbers which were added in the above example were to be subtracted from the larger number, the procedure would be the same, except that the weight lever 82 would be thrown from the left over to the right for the registering of the minuend 679, as well as for the total. It will be understood that the carrying pawls operate in the same manner for subtraction as for addition, the only difference being in the direction of rotation of the dials, and the result being that the dial of next higher denomination than the live dial is carried backward one point in the case of subtraction rather than forward one point as in the case of addition.

If, on the depression of one of the computing key levers, the clutch member 76 should fail for any reason to return to its normal position in engagement with one or the other of the idle gears, the engagement of the hook 94 with the arm 96 prevents further depression of the key levers until the operator moves the clutch into its proper position. In this way the possibility of inaccurate setting of the dials is obviated.

The arrangement of the dials in groups of threes separated by a letter space provides for a similar grouping of the numerals on the paper, the spaces between the groups of numerals being left blank or being occupied by a comma or other mark if desired.

If it is desired to perform the operations of addition and subtraction without printing the numbers, it is only necessary to move the shifting rod 150 to the right, thus moving the plate 149 and with it the key connecting links 152 forward so as to bring the contact screws 147 out of alinement with the plungers 145, so that the depression of one of the computing key levers does not cause the depression of a corresponding numeral key lever of the typewriting mechanism. On the other hand, it is to be noted that when the connecting links are in operative position the key levers of the typewriting mechanism may be operated to do the ordinary work of the typewriter, the writing down of the items or articles charged in billing, for example, without in any way interfering or affecting the computing mechanism, except that in the depression of the space bar the lifting pawl 132 is operated to raise the dog 122 to release it from engagement with the carrying pawls in case any chance to be in its path.

In the above explanatory description, a very simple example was taken, but it will be understood that the machine which I have produced is capable of executing any kind of work involving the combined functions of the typewriter and the computing machine.

I desire especially to call attention to the fact that the capacity of the computing mechanism is for practical purposes unlimited. For while I have shown in the drawings twenty-one dials, it is clear that the number may be increased to fill the dial frame from end to end if desired. This possibility is due in large measure to the fact that in my machine each dial is carried and spaced from adjacent dials by its own individual supporting member which is fixed in relation to the frame-work. In machines having the dials spaced by washers, particularly in the class of machines where the thickness of the dials is limited to a space equal to the width of the typewriter characters (from 1/11 to 1/10 of an inch), the slight variation in the thickness of the metal used in the dials and in the spacing washers, being cumulative in the washer method of spacing, results in throwing the master wheel, or other common actuating devices, out of register with some of the dials and thus limits the number of dials that can be successfully operated. In machines of the character referred to the number of dials has usually been limited to eight or nine, two dials being appropriated for decimals and six or seven to successively higher denominations. In my machine, on the other hand, the number of dials is limited only by the width of the supporting frame and of the paper carriage. Therefore, computation and tabulation of numbers of practically any magnitude are provided for. Furthermore, any blank space between the respective groups of dials can be used for the decimal point, instead of having the position of said point fixed in a series of eight or nine dials as is the case in most computing machines.

Among the other important features of the machine, it is to be noted that the double acting carrying pawl which I employ conduces greatly to the simplicity of the construction of the dial mechanism proper. The simplicity of the limit stop construction also will be appreciated by those familiar with the art.

In the operation of the machine, the method of returning the dials to "0" by simply setting the mechanism for subtraction when the total is written, I regard a notable improvement over many prior devices that have been employed for the purpose. It may be noted in this connection that a single dial may, at any time in the operation of the machine, be returned to zero in the same manner. Again if a key by mistake is partially depressed and the dial partially rotated, the latter will be restored to its initial position by simply removing the finger from the key lever, thus dispensing with the necessity of devices for locking the key levers to prevent their return in case an incomplete stroke is made and with devices for correcting the dials in such cases, which devices are neccessary in other computing machines, where ratchets and pawls are used in the actuating mechanism.

I do not in this application claim the dial mechanism *per se* as it constitutes the subject-matter of my pending application, Serial No. 477,381, filed February 11, 1909.

What I claim is:

1. The combination of registering dials, depressible keys, transmission devices between the keys and the dials comprising an oscillatory gear and a disengageable clutch between said gear and dials, and means controlled by the movement of the keys for automatically disengaging the clutch at the beginning of the movement of the gear in one direction.

2. The combination of registering dials, depressible keys, transmission devices between the keys and dials comprising an oscillatory gear, and a disengageable clutch between said gear and dials, means for normally holding the clutch in operative engagement, and means for disengaging the clutch at the beginning of the movement of the gear in one direction.

3. The combination of registering dials, depressible keys, transmission devices between the keys and dials comprising an oscillatory gear, and a disengageable clutch between said gear and dials, means for holding the clutch in operative engagement during the movement of the gear in one direction, and means for holding the clutch disengaged during the return movement of the gear.

4. The combination of registering dials, depressible keys, and means for transmitting the motion of the keys to the dials comprising a plurality of gears that are always in operative relation to each other, two of said gears running idle in opposite directions, and a clutch member adapted to be shifted into engagement with and to be driven by either of said idle gears.

5. The combination of registering dials, depressible keys, and means for transmitting the motion of the keys to the dials comprising a plurality of gears two of which are driven in opposite directions, a shiftable clutch member adapted to be moved into engagement with and to be driven by either of said two gears, and means for automatically disengaging the clutch during the return movement of the said transmitting means.

6. The combination of the registering dials, the depressible keys, and means for transmitting the motion of the keys to the dials comprising a main gear, a pair of idle gears driven in opposite directions from the main gear, a shiftable clutch member adapted to engage with and be driven by either of the idle gears, and a part with which said clutch has a slidable non-rotatable connection and through which the rotation of said clutch is transmitted to the dials.

7. The combination of registering dials, depressible keys, an oscillatory gear actuated by the depression of the keys, transmission devices between said gear and dials comprising a disengageable clutch, a lever for shifting said clutch, a universal bar arranged to be moved by the depression of the keys, and means carried by said bar for actuating the clutch shifting lever.

8. The combination of registering dials, depressible keys, an oscillatory gear actuated by the depression of the keys, transmission devices between said gear and dials comprising a disengageable clutch, a lever for shifting the clutch, means for normally holding the lever in a position to cause the operative engagement of the clutch, and means controlled by the movement of the keys for swinging the lever to disengage the clutch.

9. The combination of registering dials, depressible keys, transmission devices between the keys and the dials comprising a main gear, a pair of idle gears driven in opposite directions from the main gear, a shiftable clutch member adapted to engage with and be driven by either of the idle gears, a reversible pressure device adapted to normally hold the clutch member in operative engagement with one or the other of the idle gears according to the position of said device, and means controlled by the movement of the keys for shifting the clutch member out of operative engagement.

10. The combination of registering dials, depressible keys, transmission devices between the keys and dials comprising a main gear, a pair of idle gears driven in opposite directions from the main gear, a shiftable member adapted to engage with and to be driven by either of the idle gears, a lever for shifting the clutch member, a shiftable weight carried by said lever and adapted when in one position to press the clutch member into engagement with one of the idle gears and when in another position to press the clutch into engagement with the other idle gear, and means controlled by the movement of the keys for shifting the clutch member out of operative engagement 11. The combination of registering dials, depressible keys, transmission devices between the keys and dials comprising an oscillatory gear, a pair of idle gears driven in opposite directions from said oscillatory gear, a shiftable clutch member adapted to engage with and be driven by either of the idle gears, and means for holding the clutch member in operative engagement with either of the idle gears during the movement of the oscillatory gear in one direction, and means for holding the clutch out of operative engagement during the return movement of the oscillatory gear.

12. The combination with typewriting mechanism comprising a movable paper carriage, of a series of centrally apertured registering dials, a common actuating member arranged to move transversely through the dial apertures and to engage and turn the several dials, means for turning the actuating member, flexible means for moving the actuating member, and means for connecting the flexible means to the paper carriage when said actuating member and carriage are in any of their operative positions.

13. The combination with typewriting mechanism comprising a movable paper carriage, of a plurality of rotatable registering dials, a common actuating member mounted to move into successive engagement with the several dials, means for turning the actuating member, a flexible element connected at its ends to the actuating member and extending intermediate its ends adjacent the paper carriage, and a clutch device on the paper carriage for detachably connecting the flexible element to the carriage, whereby the dial actuating member is caused to move in unison with said carriage.

14. The combination with typewriting mechanism comprising a movable paper carriage, of a series of centrally apertured registering dials, a common actuating member arranged to move transversely through the dial apertures and to engage and turn the several dials, a rigid guide upon which the actuating member is slidably mounted, means for turning the actuating member, and flexible means connecting said actuating member and the paper carriage, whereby the actuating member is caused to move in unison with said carriage.

15. The combination with typewriting mechanism comprising a movable paper carriage, of a series of centrally apertured registering dials, a common actuating member arranged to move transversely through the dial apertures, to engage and turn the several dials, means for turning the actuating member, a flexible element connected at its ends to said actuating member and extending intermediate its ends adjacent the paper carriage, and a clutch device on the paper carriage for detachably connecting the flexible element to the carriage, whereby the dial actuating member is caused to move in unison with said carriage.

16. The combination of the centrally apertured registering dials, a longitudinally slotted quill extending through the dial apertures and rotatably supported at its ends, a common actuating device for the dials adapted to move longitudinally of the quill and to be turned by engagement with the slot thereof, a guide rod rigidly supported within said quill upon which the said actuating device is slidably and rotatably mounted, means slidably mounted on said rod for moving the dial actuating device longitudinally of the quill, and means for turning the quill.

17. The combination of the centrally apertured registering dials, a longitudinally slotted quill extending through the dial apertures and rotatably supported at its ends, a longitudinally grooved guide rod rigidly supported within the quill, a common actuating device for the dials rotatably mounted on the guide rod and having a dial engaging member extending through the quill slot, means slidably mounted in the groove of the rod for shifting the actuating device longitudinally of the quill, and means for turning the quill.

18. The combination of the centrally apertured registering dials, a longitudinally slotted quill extending through the dial apertures, and rotatably supported at its ends, a common actuating device for the dials adapted to move longitudinally of the quill and to be turned by engagement with the slot thereof, a flexible element extending through the quill and operatively connected to the dial actuating device to shift it longitudinally of the quill, and means for turning the quill.

19. The combination with a plurality of spaced supporting disks having each a laterally extending collar, a plurality of registering dials rotatably mounted on the disks, and means for supporting the disks comprising a plurality of rigidly supported tubes having transverse slots to receive the edges of the disks.

20. The combination of a plurality of spaced supporting disks having each a plurality of notches in its periphery and a laterally extending bearing collar, a plurality of registering dials rotatably mounted on the disks, and means for supporting and alining the disks comprising a plurality of rigidly supported tubes having transverse slots to receive the notched edges of the disks and core rods extending through the tubes in engagement with the peripheral notches of the disks.

21. The combination of a plurality of rotatable registering dials, means for actuating said dials individually, carrying devices arranged to connect adjacent dials during certain parts of the rotation of each dial, and means for rendering inoperative the carrying devices between the live or actuated dial and the adjacent dial of lower denomination during the turning of said live dial.

22. The combination of a plurality of rotatable registering dials, means for actuating said dials individually, carrying devices arranged to connect adjacent dials during certain parts of the rotation of each dial, and means common to the several carrying devices for rendering inoperative the carrying device between the live or actuated dial and the adjacent dial of lower denomination during the turning of said live dial.

23. The combination of a plurality of rotatable registering dials, means for actuating said dials individually, a carrying pawl mounted on each dial to rotate therewith and adapted during a part of its rotation to engage and turn the adjacent dial of higher denomination, and means for rendering the carrying-pawl of the adjacent dial of lower denomination inoperative during the turning of the live or actuated dial.

24. The combination of a plurality of registering dials, a common rotating actuating device for the dials, means comprising depressible key levers for turning the actuating device, a lock adapted for holding the actuating device against turning, a universal bar arranged to be moved by the depression of any one of the key levers, means connected with said bar for normally holding the said lock in operative engagement and adapted to release the lock at the beginning of a key depression, and means for re-applying the lock at the end of said key depression.

25. The combination of the registering dials, depressible keys for actuating the dials, disengageable transmission devices between the keys and dials, and means for preventing the dial actuating movement of the keys when said transmission devices are disengaged.

26. The combination of the registering dials, depressible keys for actuating the dials, transmission devices comprising a disengageable clutch between the keys and dials, and means for preventing the dial actuating movement of the keys when said transmission devices are disengaged.

27. The combination of a plurality of rotatable registering dials, means comprising depressible keys for turning the dials, a common alining device for the dials, and means operable at the end of the dial actuating movement of the keys to bring the alining device into engagement with the dials.

28. The combination of a plurality of rotatable registering dials having notched edges, means comprising depressible keys for turning the dials, a universal bar arranged to be moved by the depression of the keys, a common bar adapted to line the dials by engaging their notches, and means actuated by the universal bar for moving the alining bar into engagement with the dials.

29. The combination of a plurality of rotatable registering dials, a common actuating device adapted to be moved into successive engagement with the dials, carrying devices for the dials, and means for moving from dial to dial in unison with the dial actuating device for limiting the movement of each dial when turned in the carrying operation by its adjacent dial of lower denomination.

30. The combination of a plurality of rotatable registering dials having notched edges, a common actuating device adapted to be moved into successive engagement with the dials, carrying devices for the dials, and a pivoted detent movable from dial to dial in unison with the dial actuating device to engage the dial of next higher denomination than the live dial and limit its movement in the carrying operation.

31. The combination of a plurality of rotatable registering dials having notched edges, a common actuating device adapted to be moved into successive engagement with the dials, carrying devices for the dials, and a pivoted detent mounted to move from dial to dial in unison with the dial actuating device, said detent being normally in engagement with the dial of next higher denomination than the live dial to limit its movement in the carrying operation, and means for withdrawing the detent from dial engagement to permit its advance to another dial.

32. The combination of rotatable registering dials, a depressible key lever for actuating the dials, transmission devices between the key lever and dials comprising a rock shaft having an arm to be engaged and moved by the key lever, and means positively connected with the rock shaft and arranged to be moved thereby into engagement with the key lever to limit the turning of the rock shaft.

33. The combination of rotatable registering dials, a depressible key lever for actuating the dials, transmission devices between the key lever and dials comprising a rock shaft having an arm to be engaged and moved by the key lever, and an arm rigid with the rock shaft arranged to move into engagement with the key lever as the shaft is turned thereby and limit the movement of the shaft.

34. The combination of rotatable registering dials, a depressible key lever for actuating the dials, transmission devices between the key lever and dials comprising a rock shaft having an arm to be engaged and moved by the key lever, and a rigid arm on the rock shaft having an adjustable contact piece arranged to move into engagement with the key lever as the shaft is turned thereby and limit the movement of the shaft.

35. The combination of rotatable registering dials, a depressible key lever for actuating the dials, transmission devices between the key lever and dials comprising a rock shaft having oppositely extending arms arranged to engage the key lever on its depression, one of said arms being normally disposed nearer the lever than the other, whereby movement of the shaft resulting from the engagement of the key lever with the nearer arm is limited by the engagement of said lever with the other arm.

36. The combination of rotatable registering dials, a plurality of key levers for actuating the dials, transmission devices between the key levers and dials comprising a rock shaft having a plurality of arms to be engaged and moved by the key levers, and a plurality of swinging contact pieces rigid with the rock shaft and arranged each to engage a key lever on its depression to limit the movement of the rock shaft, said contact pieces being normally disposed at different distances from their respective key levers, whereby the rock shaft is given a variable throw by the depression of the different key levers.

37. The combination of rotatable registering dials, a plurality of key levers for actuating the dials, transmission devices between the key levers and dials comprising a rock shaft having a plurality of arms to be engaged and moved by the key levers, and a plurality of swinging contact pieces adjustably mounted on the rock shaft and arranged each to engage a key lever on its depression to limit the movement of the rock shaft, said contact pieces being normally disposed at different distances from their respective key levers, whereby the rock shaft is given a variable throw by the depression of the different key levers.

38. The combination of rotatable registering dials, a plurality of key levers for actuating the dials, transmission devices between the key levers and dials comprising a rock shaft having a plurality of arms of different lengths, and lever-engaging members carried by said arms, the engaging member of each arm being adjustable toward and from the shaft.

39. The combination with typewriting mechanism comprising numeral key levers, of computing mechanism comprising rotatable registering dials and key levers for actuating the same, connecting links between corresponding levers of the two sets adapted to transmit the depression of the computing levers to the typewriting levers and to permit the depression of the typewriter levers independently of the computing levers, means for adjusting the effective length of the links and means for guiding said links.

40. The combination with typewriting mechanism comprising numeral key levers, of computing mechanism comprising rotatable registering dials and key levers for actuating the same, connecting links between corresponding levers of the two sets adapted to transmit the depression of the computing levers to the typewriting levers and to permit the depression of the typewriter levers independently of the computing levers, means for guiding said links, and means for shifting the guiding means to render the links inoperative.

41. In apparatus of the character set forth, the combination of a plurality of key levers, and a pivoted bail adapted to transmit the movement of the key levers, the said bail having its cross bar formed with notches to receive the key levers and afford them lateral support throughout their working stroke.

In testimony whereof I affix my signature, in presence of two witnesses.

EDWARD H. GUYER.

Witnesses:
 EDWARD B. KREIS,
 M. F. KREIS.